(12) United States Patent
Kaneko

(10) Patent No.: US 10,384,493 B2
(45) Date of Patent: Aug. 20, 2019

(54) PNEUMATIC TIRE

(71) Applicant: The Yokohama Rubber Co., LTD., Minato-ku, Tokyo (JP)

(72) Inventor: Takeshi Kaneko, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 590 days.

(21) Appl. No.: 14/761,745

(22) PCT Filed: Jan. 7, 2014

(86) PCT No.: PCT/JP2014/050050
§ 371 (c)(1),
(2) Date: Jul. 17, 2015

(87) PCT Pub. No.: WO2014/112403
PCT Pub. Date: Jul. 24, 2014

(65) Prior Publication Data
US 2015/0352907 A1    Dec. 10, 2015

(30) Foreign Application Priority Data

Jan. 18, 2013  (JP) .................................. 2013-006801

(51) Int. Cl.
*B60C 13/00* (2006.01)
*B60C 5/00* (2006.01)
*B60C 13/02* (2006.01)

(52) U.S. Cl.
CPC .............. *B60C 13/001* (2013.01); *B60C 5/00* (2013.01); *B60C 13/02* (2013.01)

(58) Field of Classification Search
CPC ....... B60C 13/001; B60C 13/00; B60C 13/02; B60C 5/00
See application file for complete search history.

(56) References Cited

U.S. PATENT DOCUMENTS

D682,191 S    5/2013  Ebiko et al.
D683,303 S    5/2013  Ebiko et al.
(Continued)

FOREIGN PATENT DOCUMENTS

CN    102627057    8/2012
JP    H07-164831   6/1995
(Continued)

OTHER PUBLICATIONS

International Search Report for International Application No. PCT/JP2014/050050 dated Apr. 8, 2014, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

A region on a sidewall surface of at least one of a pair of side portions of a pneumatic tire includes a maximum tire width position. The region is provided with a plurality of recesses shaped as dimples varying periodically in size along a tire circumferential direction, and with a plurality of trough portions shaped as lines, disposed around each of the recesses, and extending unidirectionally so as to cover the recesses. The recesses are, for example, at least three types of circular recesses, each type having a different size. Here, the circular recesses vary stepwise in size along the tire circumferential direction. The bottom face of the circular recesses is spherical. The maximum depth of the circular recesses is constant irrespective of size, being from 0.3 mm to 1.5 mm.

18 Claims, 5 Drawing Sheets

(56) References Cited

U.S. PATENT DOCUMENTS

2012/0118466 A1    5/2012   Ebiko et al.
2012/0199261 A1    8/2012   Yamakawa

FOREIGN PATENT DOCUMENTS

| | | |
|---|---|---|
| JP | H11-321243 | 11/1999 |
| JP | 2000-255223 | 9/2000 |
| JP | 4803316 | 10/2011 |
| JP | 2011-255768 | 12/2011 |
| JP | 2012-106583 | 6/2012 |
| WO | WO 2012-066717 | 5/2012 |

PNEUMATIC TIRE

TECHNICAL FIELD

The present technology relates to a pneumatic tire, and particularly relates to a design for a sidewall surface of a pneumatic tire.

BACKGROUND

In recent years, reduction in rolling resistance of a pneumatic tire has been sought in order to improve the fuel economy of a vehicle on which the pneumatic tire is mounted and to improve the maximum speed of the vehicle. In order to reduce the rolling resistance of the pneumatic tire, various aspects in which the construction of the pneumatic tire, the tread pattern design, and the like are changed have been proposed.

Also, in order to improve the fuel economy of the vehicle and to improve the maximum speed of the vehicle, reducing the air resistance of the pneumatic tire during rolling motion has been proposed. The air resistance of the pneumatic tire is affected by concave and convex of a tread pattern provided on a tread portion surface and by concave and convex in markings and a pattern provided on a sidewall surface.

For example, a pneumatic tire is known that has no spew or cut traces of spew on the sidewall surface and is able to reduce air resistance (see Japanese Unexamined Patent Application Publication No. 2012-106583A).

A first region in the sidewall surface of such a pneumatic tire includes a maximum tire width position and is provided with a plurality of recesses shaped as dimples. A serration process is applied around each of the recesses to provide a plurality of trough portions shaped as lines extending unidirectionally to enclose the recesses.

The above-described pneumatic tire is provided with a plurality of recesses shaped as dimples in a region that includes the maximum tire width position on the sidewall surface of the tire. Thus, it is possible to reduce air resistance produced during the rolling motion of the pneumatic tire, which is effective in improving the fuel economy.

Conversely, in order to achieve a reduction in weight and low rolling resistance for the pneumatic tire, the thickness of the sidewall (hereinafter, also referred to as side gauge) is made thinner. However, making the side gauge thinner tends to produce appearance defects in the sidewall surface with high probability. Such appearance defects have no negative effect on tire durability or on maneuverability, yet cause a user to suspect that the tire is of low quality in terms of durability and maneuverability. Specifically, in a molding process during tire manufacture, a carcass member shaped as a sheet is wound once over a tire molding drum. A winding starting end and a winding finishing end of the carcass member partially overlap to form a joint. Therefore, the thickness is greater at this overlapping portion. This portion ultimately appears as undulations in the sidewall surface of the finished tire. Specifically, such undulations are remarkable in a radial tire using one carcass member.

In a pneumatic tire provided with the plurality of recesses shaped as dimples on the sidewall surface, as described above, providing the plurality of dimples serves to make the undulations actually appearing in the sidewall surface more difficult to notice. Making the undulations less noticeable is sought.

SUMMARY

The present technology provides a pneumatic tire that reduces air resistance during tire rolling motion while also being able to make the undulations actually appearing in the sidewall surface less noticeable.

One aspect of the present technology is a pneumatic tire. The pneumatic tire includes a tread portion, a pair of bead portions, and a pair of side portions provided on both sides of the tread portion, connecting the pair of bead portions to the tread portion.

A region on a sidewall surface of at least one of the pair of side portions includes a maximum tire width position. The region is provided with a plurality of recesses shaped as dimples varying periodically in size along the tire circumferential direction, and with a plurality of linearly extending trough portions, disposed around each of the recesses so as to cover the recesses, the trough portions extending in an identical direction.

Preferably, the recesses are circular recesses varying periodically in size along the tire circumferential direction, a bottom face of each circular recess is spherical, and the maximum depth of each circular recess is constant irrespective of size.

Preferably, the circular recesses include at least three types of recesses that differ in size, and the circular recesses vary in size stepwise along the tire circumferential direction.

Also, the maximum depth of each circular recess is preferably from 0.3 mm to 1.5 mm.

Also, recess rows are formed with the recesses along a tire radial direction, recesses within each of the recess rows being constant in size.

Preferably, a period length of change in size for the recesses is not less than 3% and not greater than 20% of a circumferential length of the tread portion of the pneumatic tire.

Also, the recesses are preferably perfect circular recesses having a diameter of 3.0 mm to 15.0 mm.

Preferably, the surface area ratio of total surface area occupied by the recesses to surface area of the region is from 25% to 60%.

The recesses are preferably provided as far as a lower edge position along the tire radial direction on the sidewall surface located in a range of 30% to 50% of tire cross-sectional height as measured outward in the tire radial direction from a bottom-most edge of the bead portions.

The recesses are preferably provided at constant intervals along the tire circumferential direction.

The linear trough portions are preferably provided at constant intervals.

According to the above-described pneumatic tire, air resistance during tire rolling motion is reduced, and undulations actually appearing in a sidewall surface are made less noticeable.

DETAILED DESCRIPTION

The details of a pneumatic tire according to the present embodiment (hereinafter, simply referred to as a tire) are described below.

The below-described pneumatic tire of the present embodiment is, for example, applied to a tire for a passenger vehicle, and may also be applied to a tire for a small truck, or as a tire for a bus and a truck. The pneumatic tire of the present embodiment described below is a tire for a passenger vehicle.

In the following description, a tire width direction is a direction parallel to a rotational axis of the pneumatic tire. An outer side in the tire width direction is a side distant from a tire center line CL representing the tire equatorial plane in the tire width direction. Also, an inner side in the tire width direction is a side closer to the tire centerline CL in the tire width direction. A tire circumferential direction is a direction of rotation of the pneumatic tire about the center of the rotational axis. A tire radial direction is a direction perpendicular to the rotational axis of the pneumatic tire. An outer side in the tire radial direction is a side distant from the rotational axis. Similarly, an inner side in the tire radial direction is a side closer to the rotational axis.

(Tire Structure)

Figure 1:
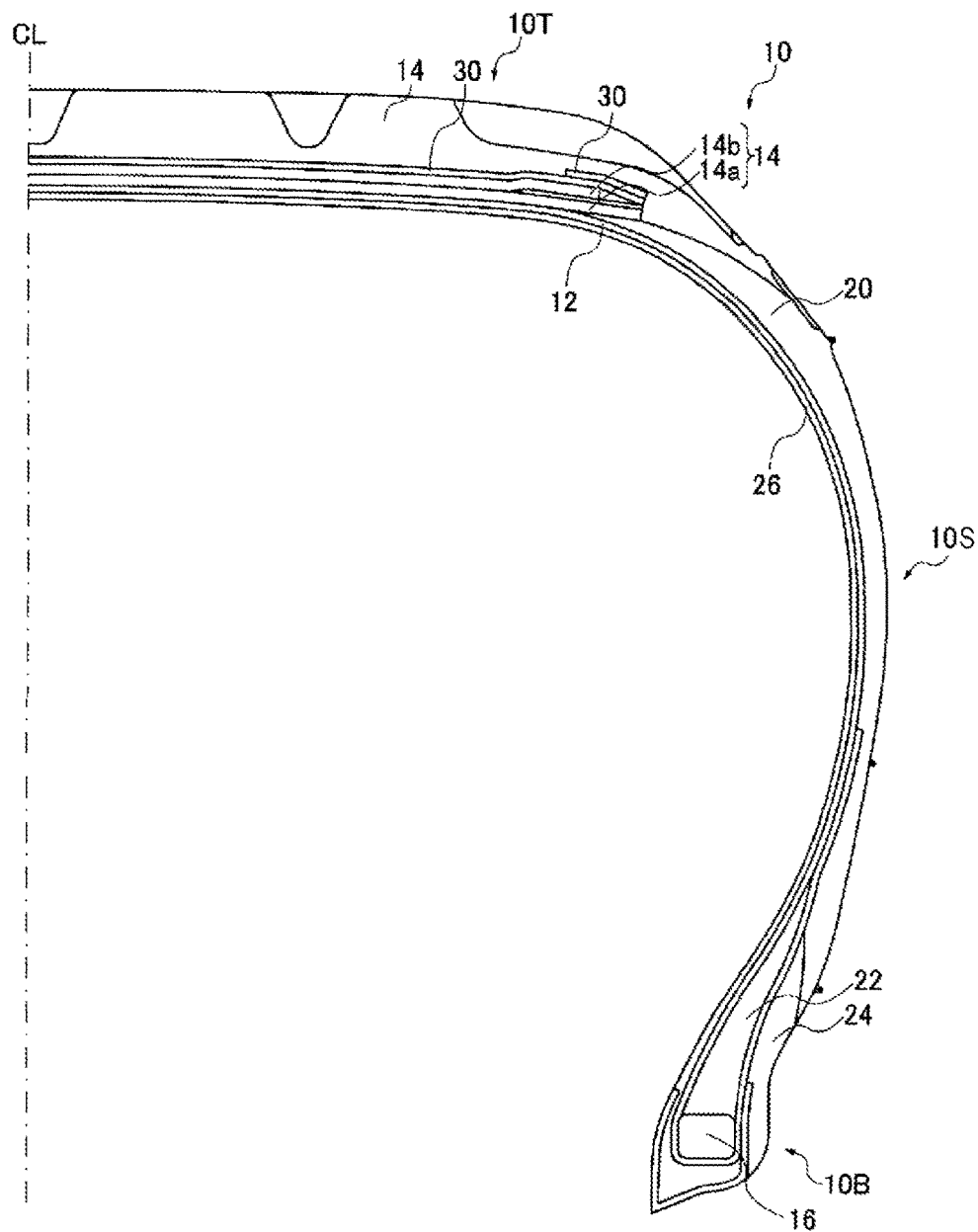
FIG. 1 is a profile cross-sectional view of a pneumatic tire of the present embodiment.

FIG. 1 is a profile cross-sectional view of a tire 10 of the present embodiment. The tire 10 includes a tread portion 10T having tread pattern, a pair of bead portions 10B, and a pair of side portions 10S provided on both sides of the tread portion 10T, connecting the pair of bead portions 10B and the tread portion 10T.

The tire 10 mainly includes, as skeletal material, a carcass ply layer 12, a belt layer 14, and a bead core 16, with a tread rubber member 18, a side rubber member 20, a bead filler rubber member 22, a rim cushion rubber member 24, and an inner liner rubber member 26 around these skeletal materials.

The carcass ply layer 12 is configured from a carcass ply material formed in a toroidal shape wound between the pair of bead cores 16, which are annular, and made up of organic fiber coated with rubber. The carcass ply material is wound around the bead cores 16 and extends as far as the outer side in the tire radial direction. The belt layer 14 is provided on the outer side in the tire radial direction of the carcass ply layer 12, and is configured from two belt members 14a, 14b. The belt layer 14 is a member formed from steel cords arranged at a predetermined inclination with respect to the tire circumferential direction, for example from 20° to 30°, and coated with rubber. A lower layer belt member 14a is wider than an upper layer belt member 14b in the tire width direction. The two-layer belt members 14a, 14b are opposite in terms of the incline direction of respective steel cords therein. As such, the belt members 14a, 14b are crossing layers serving to suppress expansion of the carcass ply layer 12 due to inflated air pressure.

The tread rubber member 18 is provided on the outer side of the belt layer 14 in the tire radial direction. The side portions connected to the side rubber member 20 are formed at both end portions of the tread rubber member 18. The rim cushion rubber member 24 is provided on the end of the side rubber member 20 on the inner side in the tire radial direction, and comes into contact with a rim on which the tire 10 is mounted. The bead filler rubber member 22 is provided on the outer side of the bead cores 16 in the tire radial direction, being sandwiched between a portion of the carcass ply layer 12 prior to being wound around the bead cores 16 and a wound portion of the carcass ply layer 12 wound around the bead cores 16. The inner liner rubber member 26 is provided on an inner surface of the tire 10 facing a tire cavity region that is filled with air and is surrounded by the tire 10 and the rim.

Additionally, the tire 10 is provided with a bead stiffener 28 between the carcass layer 12 wound around the bead cores 16 and the bead filler rubber member 22 and is further provided with two layers of a belt cover layer 30 formed from organic fibers covered with rubber that covers the belt layer 14 from the outer side in the tire radial direction of the belt layer.

No particular limitation is intended to the tread pattern of the tire 10 of the present embodiment.

(Sidewall Pattern)

Figure 2:
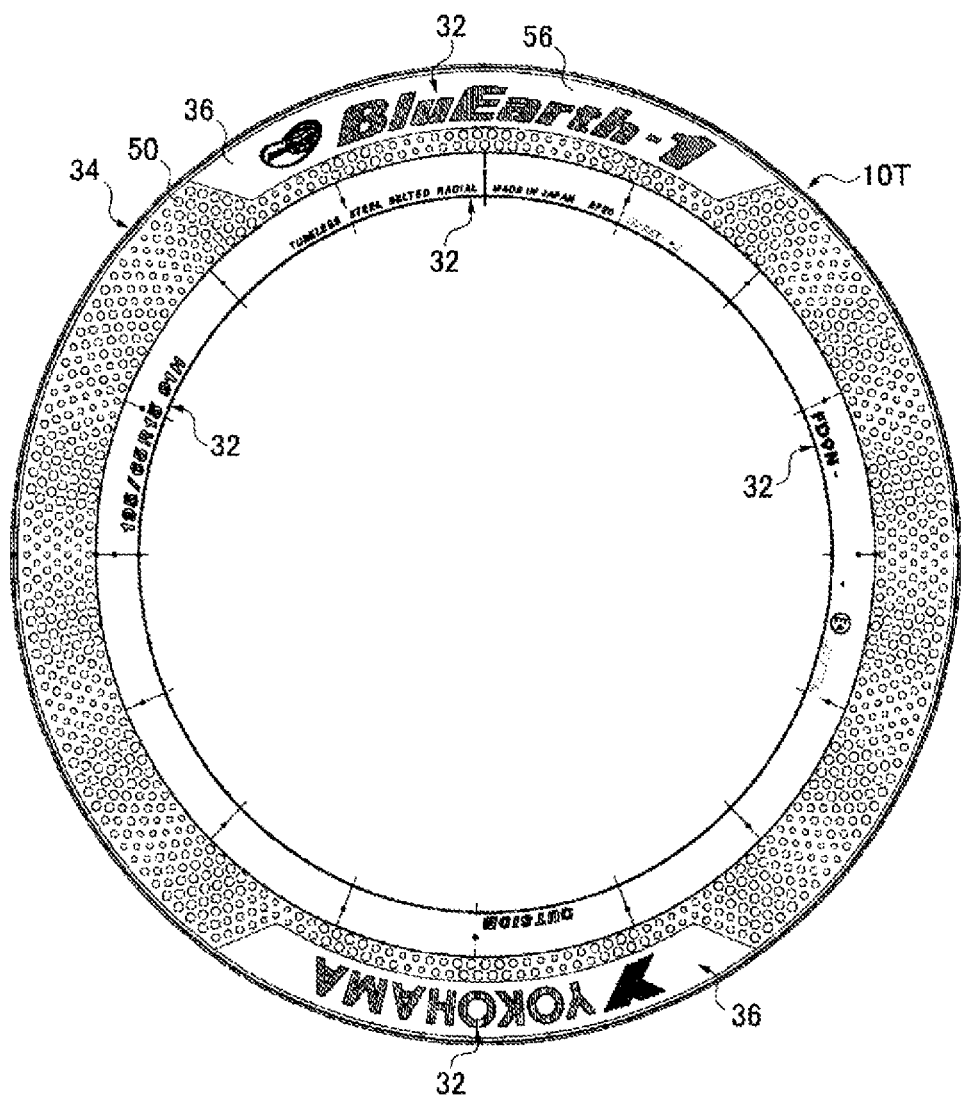
FIG. 2 is a diagram illustrating a side portion surface of the present embodiment.
Figure 3:
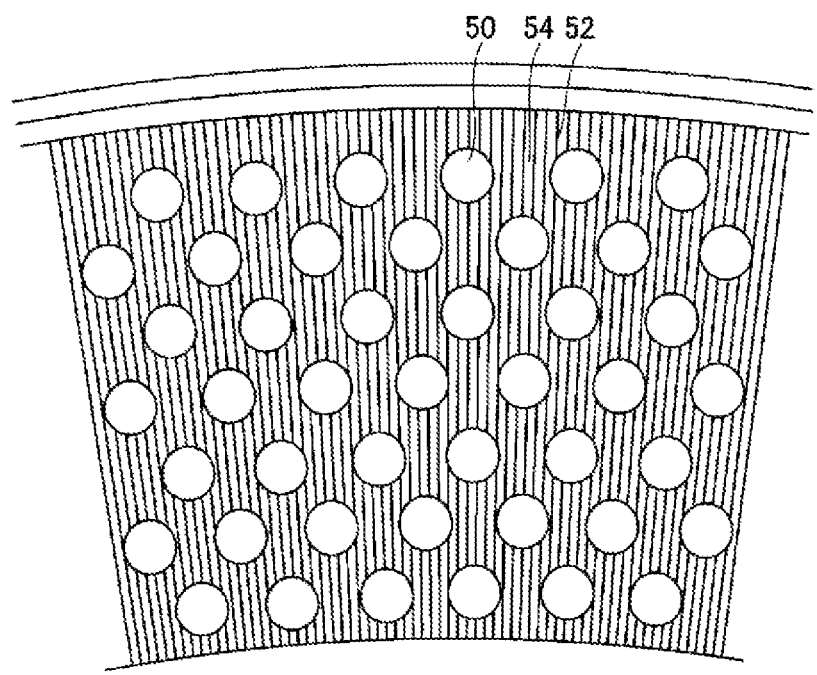
FIG. 3 is a diagram illustrating a magnified portion of a pattern on a sidewall surface of the side portion of the present embodiment.

FIG. 2 is a diagram illustrating the surface of the side portions 10S. FIG. 3 is a diagram illustrating a magnified portion of the pattern on the sidewall surface of the side portions 10S.

The sidewall surface of the side portions 10S includes an information display region 32 where information such as the name of the tire, the tire size, the tire manufacturer, and the like are displayed, a pattern region 34 defining the markings (pattern) of the sidewall surface, and an undecorated region 36 that is a smooth face provided so as to enclose information display region 32. The pattern region 34 includes a maximum tire width position. The pattern region 34 is preferably provided at a position located at from 30% to 80% of the tire cross-sectional height as measured from a bottom-most edge of the bead portions of the tire toward the tire tread portion (i.e., toward outer side in the tire radial direction).

The pattern region 34 is provided with a plurality of recesses (the round portions in FIG. 2) 50 shaped as dimples that vary periodically in size along the tire circumferential direction, and with a plurality linearly extending of trough portions 52, provided around the recesses 50 so as to enclose each of the recesses 50, the trough portions 52 respectively extending in the identical direction. The trough portions 52 are created on the sidewall surface of the tire 10 during vulcanization, due to concave and convex in the surface of a vulcanization mold formed by a serration process. The trough portions 52, being linear, are preferably provided at constant intervals, in order to emphasize the periodic change in size of the recesses 50 along the tire circumferential direction. Also, the trough portions 52 are preferably provided linearly extending along the tire radial direction, in order to emphasize the periodic change in size of the recesses 50 along the tire circumferential direction. Here, the trough portions 52 are preferably provided as lines at constant intervals in the tire circumferential direction. Also, the trough portions 52 are not illustrated in FIG. 2 because the trough portions 52 are provided closely to an extent that indicating the density of the trough portions 52 would completely darken the pattern region 34. In a preferable aspect, the recesses 50 are circular recesses each having a perfect circular shape or an elliptical shape. The size of the circular recesses varies periodically along the tire circumferential direction, the bottom face of each circular recess is spherical, and the maximum depth of the circular recesses is constant, irrespective of size. As illustrated in FIG. 2, the recesses 50 are preferably provided at constant intervals along the tire circumferential direction in order to emphasize the periodic change in size of the recesses 50 along the tire circumferential direction. Also, as illustrated in FIG. 2, recess rows are formed with the recesses 50 along the tire radial direction. The size of the recesses 50 in each of the recess rows is preferably constant in order to emphasize the periodic change in size of the recesses 50 along the tire circumferential direction. Also, as illustrated in FIG. 2, in terms of a given recess row of interest and a neighboring recess row neighboring the given recess row, each of the recesses in the neighboring recess row is preferably positioned, in the tire radial direction, at a midpoint along the tire radial direction between two of the adjacent recesses in the given recess row.

The maximum tire width position is a position in the tire radial direction at which the tire width in the tire width direction is at a maximum. Specifically, the tire width is a maximum width between the side portions on both sides, obtained when the tire is mounted on a defined rim and inflated to a defined air pressure as defined by the Japanese Automobile Tire Manufacturers Association (JATMA), the European Tyre and Rim Technical Organisation (ETRTO), or the Tire and Rim Association (TRA). The trough portions 52 are provided around the recesses 50, as lines extending in an identical direction so as to enclose the recesses 50. A ridge 54 is formed between each pair of neighboring trough portions 52, and extends along the trough portions 52. The ridges 54 are formed by providing the trough portions 52. A serration pattern is formed by the trough portions 52 and the ridges 54.

The undecorated region 36, made up of the smooth face 56 where the trough portions 52 are not provided (see FIG. 4), is provided so as to neighbor the edges of the pattern region 34. The information display region 32 is surrounded by the undecorated region 36. The pattern region 34 is formed around the tire circumference. However, the pattern region 34 has a narrower width at the position along the tire circumferential direction where the undecorated region 36 is provided. At this position, the pattern region 34 is provided on the inner side in the tire radial direction, and the undecorated region 36 is provided on the outer side in the tire radial direction. The narrower-width portion of the pattern region 34 and the undecorated region 36 are provided so as to contact with each other along the tire circumferential direction.

Such a sidewall pattern of the side portions 10S is provided on both side walls of the pneumatic tire, or may be provided on one side surface only. In such circumstances, mounting the tire on the vehicle is preferably performed such that the tire 10 is mounted with the pattern region 34 of the present embodiment facing an outer side of the vehicle.

The length between the trough portions 52, indicated by straight lines in FIG. 3, is smaller than the diameter of the circles of the recesses 50. The recesses 50 need not have a circular shape, but may also have an elliptical shape, or a shape close to a rectangular shape or a polygonal shape. In such circumstances, the length between the trough portions 52 is smaller than an equivalent diameter, calculated from the occupied surface area of the sidewall surface occupied by the recesses 50, in terms of the diameter of a circle. The diameter of the circle or the equivalent diameter is, for example, from 3 mm to 15 mm. Having the diameter of the circle or the equivalent diameter be smaller than 3 mm poses difficulties in that air surrounding the rotating tire 10 leads to turbulence and peeling due to the recesses 50. Thus, the air resistance reduction effect is decreased, and the fuel economy of the running vehicle is degraded. The diameter of the circle or the equivalent diameter of the individual recesses 50 is preferably from 3 mm to 10 mm, and more preferably from 4 mm to 8 mm. Also, the diameter of the circle or equivalent diameter of the individual recesses 50 is preferably from 3 times to 10 times the length between neighboring trough portions 52.

Further, in terms of air resistance reduction, the surface area ratio of the total surface area occupied by the recesses 50 relative to the surface area of the pattern region 34 serving as a first region where the trough portions are provided (i.e., total recess surface area ratio) is preferably from 25% to 60%.

Figure 4:
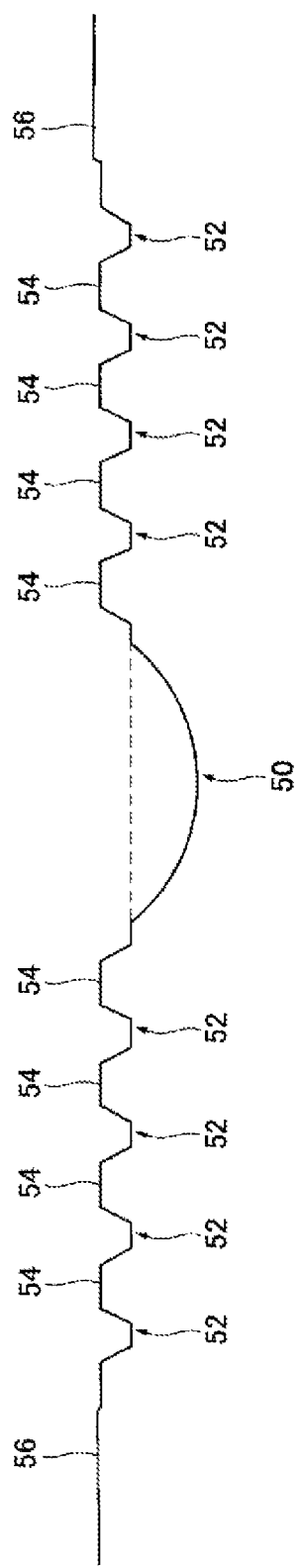
FIG. 4 is a magnified cross-sectional diagram describing trough portions and recesses in the present embodiment.
Figure 5:
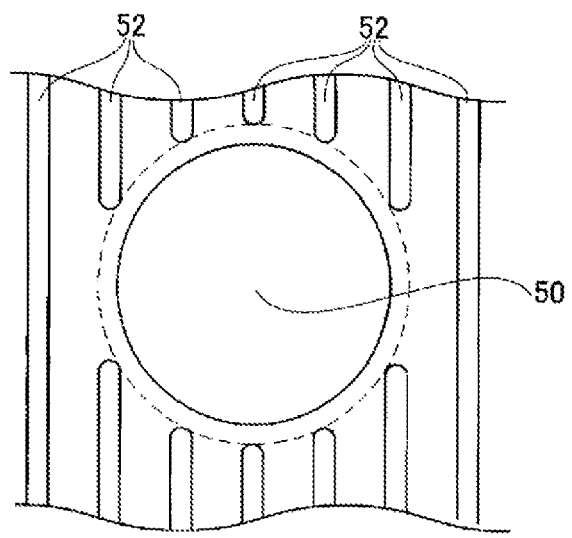
FIG. 5 is a plan view describing in detail a relationship between the trough portions and recesses of the present embodiment.

FIG. 4 is a magnified cross-sectional view describing the depth of the trough portions 52 and the recesses 50 on the side portions 10S of the tire 10 in the present embodiment.

The depth of the trough portions 52 from the sidewall surface is preferably shallower than the depth of the recesses 50 from the sidewall surface. Here, the sidewall surface serving as a reference for the depth is the smooth face 56 in the undecorated region 36. Having the depth of the trough portions 52 be shallow in comparison to the depth of the recesses 50 enables an effective reduction of appearance defects produced by dead air accumulated between the sidewall of the tire and the vulcanization mold surface during vulcanization, and also enables an effective reduction in air resistance. Preferably, the depth of the trough portions 52 is shallower than the depth of the recesses 50 by 0.2 mm to 1.0 mm. Having the difference between the depth of the recesses 50 and the depth of the trough portions 52 be less than 0.2 mm reduces the air resistance reduction effect. Conversely, having the difference between the depth of the recesses 50 and the depth of the trough portions 52 be greater than 1.0 mm makes appearance defects more likely to occur. In addition, the ridges 54 located between each pair of neighboring trough portions 52 are indented with respect to the smooth face 56. Accordingly, the sidewall surface includes depressions having increasing depth relative to the smooth face 56 in the order of the ridges 54, the trough portions 52, and the recesses 50. These depressions are portions shifting the level of the sidewall toward the inner circumferential surface side of the tire, facing the tire cavity region.

In the present embodiment, each of the plurality of the recesses 50 and each of the plurality of the trough portions 52 have the same depth. However, the depth need not necessarily be the same. A groove depth may increase with the size of the recesses 50.

As illustrated in FIG. 4, the recesses 50 are preferably formed so as to each be further depressed from the bottom face of a nearby trough portion 52. As the side rubber member 20 on the pattern region 34, rubber having a hardness (as measured conforming to a durometer hardness test stipulated by JIS K6253 using a type A durometer at a temperature of 20° C.) of 51 to 56 may be used. However, using rubber having a hardness of 56 to 65 further prevents the occurrence of appearance defects due to dead air space during vulcanization.

In such a pattern region 34, the plurality of recesses 50, being shaped as dimples, vary periodically in size along the tire circumferential direction as illustrated in FIG. 2. Here, the recesses 50 are preferably provided at constant intervals in the tire circumferential direction. The periodic variation in the recesses 50 may be a continuous change or an intermittent change. Periodically varying the size in this manner enables to attract a viewer's attention to the sidewall surface by the pattern of the pattern region 34, which appears to form a density change thereof along the tire circumferential direction, as illustrated in FIG. 2. This also makes undulations actually appearing in the sidewall surface due to overlap of the winding starting end and the winding finishing end of the carcass member more difficult to perceive.

The maximum depth of the recesses 50 is preferably constant, irrespective of size. Particularly, the recesses 50 have a circular shape. Given that the bottom face of each recess 50 is a spherical depression, then having the maximum depth be constant irrespective of the size of the recesses 50 leads to an inclination angle in the depth direction at the bottom face in the vicinity of the edge in the largest recess 50 being smaller than the inclination angle in the depth direction at the bottom face in the vicinity of the edge in the smallest recess 50. Thus, a reflection angle of light at the bottom face in the recesses 50 changes with the size of the recesses 50. Therefore, the person viewing the sidewall surface is able to perceive the pattern of the sidewall created by the reflection characteristics of the recesses 50 in addition to the changing in size of the recesses 50. Thus, the viewer's attention is further attracted on sight by the pattern in the pattern region 34 and is more likely to overlook the undulations actually appearing in the sidewall surface.

Also, the recesses 50 include at least three types of circular recesses, each having a different size. These circular recesses are preferably arranged so as to vary stepwise in size along the tire circumferential direction. The example illustrated in FIG. 2 includes three types of circular recesses, with seven largest circular recesses, seven mid-sized circular recesses, and seven smallest circular recesses as one group, and a plurality of groups being continuously provided along the tire circumferential direction.

The recesses 50 are preferably circular recesses having a perfect circular shape and a diameter of 3.0 mm to 15.0 mm. A diameter of less than 3.0 mm makes the person viewing the pattern on the sidewall less likely to have their gaze caught by the pattern. The person is thus less likely to overlook the undulations actually appearing in the surface of the sidewall. In addition, the diameter of less than 3.0 mm makes the processing of the vulcanization mold used to vulcanize the tire more difficult. A diameter exceeding 15 mm makes each individual recess 50 large in size, and makes the person viewing the pattern on the sidewall less likely to have their gaze caught by the pattern. A diameter of the circular recesses is more preferably from 3.5 mm to 8.0 mm.

Also, a maximum depth of the recesses 50 is preferably from 0.3 mm to 1.5 mm. A maximum depth of less than 0.3 mm makes the person viewing the pattern on the sidewall less likely to have their gaze caught by the pattern. A maximum depth of greater than 1.5 mm requires a greater thickness for the side rubber member 20, and is thus prone to degrading the rolling resistance. A maximum depth is more preferably from 0.3 mm to 1.0 mm.

The size of the recesses 50 includes, for example, three types (namely a small type, a medium type, and a large type). Arranging the recesses 50 along the tire circumferential direction so as to periodically repeat stepwise in the order small, medium, large, small, medium, large, and the like is preferable in terms of enabling a reduction in air resistance for the tire 10 during rolling motion. In such circumstances, given a period length P and a tire circumferential length L, P is preferably from 0.03 to 0.20 times L. Having the period length P be less than 0.03 times L and having the period length P exceed 0.20 times L causes the small, medium, large or large, medium, small arrangement of the recesses 50 to become dense, which makes the person viewing the periodic change in size of the recesses 50 less likely to have their gaze caught by the pattern. The period length P is more preferably from 0.04 to 0.07 times L.

Also, the surface area ratio of the overall surface area occupied by the recesses 50 relative to the surface area of the pattern region 34 is preferably from 25% to 60%, in terms of reducing the air resistance. Having the above-described surface area ratio be less than 25% prevents air resistance reduction, and also makes the recesses 50 overly decreased in the density thereof. Thus, the person viewing the pattern in the pattern region 34 is less likely to have their gaze caught by the pattern and the undulations actually appearing in the sidewall surface are more likely to be perceived. Having the above-described surface area ratio exceed 60% prevents air resistance reduction. The above-described surface area ratio is more preferably from 30% to 45%.

Also, given a bottom edge position on the sidewall surface located at a height from 30% to 50% of the tire cross-sectional height as measured from the bottom-most edge of the bead portions of the tire toward the tire tread portion (i.e., toward outer side in the tire radial direction), providing the recesses 50 as far as the bottom edge position is preferable in terms of drawing the attention of the person viewing the side pattern to the periodically-changing size of the recesses 50. In the example illustrated in FIG. 2, the bottom edge position for the recesses 50 is located at 40% of the tire cross-sectional height as measured from the bottom-most edge of the bead portions of the tire toward the outer side in the tire radial direction.

Working Examples, Conventional Example, Comparative Examples

In order to investigate the effects of the present embodiment, tires were manufactured having the sidewall pattern as illustrated in FIG. 2. The size of each manufactured tire was 195/65R15 91H. The evaluation of the manufactured tires was performed by mounting four of the manufactured tires on a passenger vehicle with a motor assist drive having an engine capacity of 1500 cc (mounting rim: 15×16J, tire air pressure: front wheels 230 kPa, rear wheels 220 kPa), and evaluating the fuel consumed per unit of running distance upon driving 500 laps around a 2 km circuit course at 100 km/h. The evaluation involved calculating fuel economy (l/km) from the amount of consumed fuel, and was represented by an index with reference to fuel consumption of a conventional example (index 100). The fuel economy was indexed such that a higher index indicates better fuel economy. Meanwhile, the manufactured tires were seen by 100 people at a distance of 1 m from the tires to investigate whether or not the undulations actually appearing in the sidewall surface of the tires were perceived (visibility test).

The visibility results were 110 points when at least 95 out of 100 viewers (people seeing the tires) are unable to clearly perceive the undulations actually present, 108 points when at least 90 and at most 94 out of 100 viewers are unable to clearly perceive the undulations actually present, 106 points when at least 80 and at most 89 out of 100 viewers are unable to clearly perceive the undulations actually present, 104 points when at least 70 and at most 79 out of 100 viewers are unable to clearly perceive the undulations actually present, 102 points when at least 60 and at most 69 out of 100 viewers are unable to clearly perceive the undulations actually present, 100 points when at least 50 and at most 59 out of 100 viewers are unable to clearly perceive the undulations actually present, and 97 points when not greater than 49 out of 100 viewers are unable to clearly perceive the undulations actually present.

Table 1, below, shows the specifications of Working Examples 1 to 9, a Conventional Example, and a Comparative Example, along with the evaluation results.

Working Examples 1 to 7 each featured three types (large, medium, small) or five types of the recesses 50, and varied in terms of the period length P relative to the tire circumferential length L.

Working Examples 8 and 9 had a fixed total surface area ratio for the recesses 50 and varied the size of the recesses 50 relative to Working Example 1.

The Conventional Example uses a single size type for the recesses 50. In the Comparative Example, the lines of the trough portions 52 were not provided as the serration process was not applied.

In Working Examples 1 to 9 and in the Comparative Example, the maximum depth of the recesses 50 was fixed irrespective of size.

The recesses 50 were circular recesses having a perfect circular shape, and the bottom face of each recess 50 was spherical.

Comparing Working Example 1, the Conventional Example, and the Comparative Example as shown in Table 1, above, reveals that periodically varying the size of the recesses 50 and providing the pattern region 34 with the trough portions 52 provided enables visibility of the surface undulations to be suppressed while improving the fuel economy.

The evaluation results of Working Example 1 and Working Example 2 reveal that providing three types or five types of sizes for the recesses 50 leads to excellent suppression of surface undulation visibility and decrease in the air resistance.

Furthermore, comparing Working Examples 1 to 7 reveals that, in terms of periodically varying the size of the recesses 50, the proportion of the period length P to the tire circumferential length is preferably from 0.03 to 0.2 (from 3% to 20%).

Also, comparing Working Examples 8 and 9 to Working Example 1 reveals that the diameter of the recesses 50 is preferably within a range of 3 mm to 15 mm.

TABLE 1

|  | Working Example 1 | Working Example 2 | Working Example 3 | Working Example 4 | Working Example 5 | Working Example 6 |
|---|---|---|---|---|---|---|
| Presence and Number of Types of Recesses | Present, 3 Types | Present, 5 Types | Present, 3 Types | Present, 3 Types | Present, 3 Types | Present, 3 Types |
| Presence of Region Serration Process Applied | Present | Present | Present | Present | Present | Present |
| Diameter of recesses (mm) | 3.6 mm, 4.8 mm, 5.6 mm | 3.0 mm, 3.6 mm, 4.6 mm, 5.6 mm, 6.0 mm | 5.0 mm, 7.0 mm, 9.0 mm | 6.0 mm, 8.0 mm, 10.0 mm | 7.0 mm, 9.0 mm, 11.0 mm | 8.0 mm, 9.0 mm, 12.0 mm |
| Depth of recesses (mm) | 0.5 mm | 0.5 mm | 0.5 mm | 0.5 mm | 0.5 mm | 0.5 mm |
| Recess Period Length P (mm)/ Circumferential Length L (mm) | 0.04 | 0.04 | 0.02 | 0.03 | 0.15 | 0.2 |
| Overall Surface Area Ratio (%) for recesses | 28.5 | 28.5 | 30.0 | 22.5 | 36.0 | 24.0 |
| Fuel Economy | 104 | 103 | 102 | 102 | 102 | 102 |
| Surface Undulation Visibility | 110 | 110 | 106 | 108 | 108 | 108 |

|  | Working Example 7 | Working Example 8 | Working Example 9 | Conventional Example | Comparative Example |
|---|---|---|---|---|---|
| Presence and Number of Types of Recesses | Present, 3 Types | Present, 3 Types | Present, 3 Types | Present, 1 Type | Present, 3 Types |
| Presence of Region Serration Process Applied | Present | Present | Present | Present | None |
| Diameter of recesses (mm) | 11.0 mm, 12.0 mm, 15.0 mm | 17.0 mm, 20.0 mm, 23.0 mm | 1.0 mm, 2.0 mm, 2.5 mm | 3.0 mm | 4.2 mm, 4.8 mm, 5.4 mm |
| Depth of recesses (mm) | 0.5 mm | 0.5 mm | 0.5 mm | 0.5 mm | 0.5 mm |
| Recess Period Length P (mm)/ Circumferential Length L (mm) | 0.25 | 0.04 | 0.04 | None | 0.04 |
| Overall Surface Area Ratio (%) for recesses | 33.0 | 28.5 | 28.5 | 28.5 | 28.5 |
| Fuel Economy | 102 | 102 | 102 | 100 | 101 |
| Surface Undulation Visibility | 106 | 104 | 104 | 100 | 102 |

According to the above, the conclusion is drawn that the tire 10 of the present embodiment is able to reduce the air resistance during the rolling motion of the tire, and is also able to make undulations actually present in the sidewall surface difficult to perceive.

The pneumatic tire of the present technology has been described in detail above. However, no limitation of the present technology to the above-described embodiment and examples is intended. Various improvements and variations are of course applicable.

The invention claimed is:

1. A pneumatic tire comprising:
a tread portion;
a pair of bead portions; and
a pair of side portions provided on both sides of the tread portion, connecting the pair of bead portions to the tread portion;
in a region on a sidewall surface of at least one side portion of the pair of side portions including a maximum tire width position, a plurality of recesses shaped as dimples varying periodically in size along a tire circumferential direction being provided, and a plurality of linearly extending trough portions being provided around each of the recesses so as to enclose each of the recesses, the trough portions extending parallel to one another, wherein
the recesses are circular recesses having a shape selected form a perfect circular shape and an elliptical shape, having a size thereof varying periodically stepwise along the tire circumferential direction while maintaining the selected shape, and being arranged such that a center-to-center distance in the tire circumferential direction between adjacent recesses in the tire circumferential direction is constant irrespective of the size varying periodically in the tire circumferential direction, and
recess rows are formed with the recesses along a radial direction, recesses within each of the recess rows being constant in size.

2. The pneumatic tire according to claim 1, wherein each of the recesses is a circular recess having the perfect circular shape, the circular recesses varying periodically in a diameter of the perfect circular shape along the tire circumferential direction,
a bottom face of the circular recess is spherical, and
a maximum depth of the circular recess is constant irrespective of the diameter.

3. The pneumatic tire according to claim 2, wherein the circular recesses include at least three types of recesses that differ in size, and
the circular recesses vary in size stepwise along the tire circumferential direction.

4. The pneumatic tire according to claim 3, wherein the maximum depth of the circular recess is from 0.3 mm to 1.5 mm.

5. The pneumatic tire according to claim 2, wherein the maximum depth of the circular recess is from 0.3 mm to 1.5 mm.

6. The pneumatic tire according to claim 2, wherein the bottom face has a curvature radius decreasing as the diameter decreases.

7. The pneumatic tire according to claim 1, wherein a period length of change in size for the recesses is not less than 3% and not greater than 20% of a circumferential length of the tread portion of the pneumatic tire.

8. The pneumatic tire according to claim 1, wherein each of the recesses is a perfect circular recess, a diameter of the perfect circular recess being from 3.0 mm to 15.0 mm.

9. The pneumatic tire according to claim 1, wherein a surface area ratio of total surface area occupied by the recesses to a surface area of the region is from 25% to 60%.

10. The pneumatic tire according to claim 1, wherein the recesses are provided as far as a lower edge position, the lower edge position being a position along a tire radial direction on the sidewall surface located in a range of 30% to 50% of tire cross-sectional height as measured toward on the outer side in the tire radial direction from a bottom-most edge of the bead portions.

11. The pneumatic tire according to claim 1, wherein the trough portions are provided at constant intervals.

12. The pneumatic tire according to claim 1, wherein recess columns are formed with the circular recesses at identical positions in the radial direction, each of the recess columns extending along the circumferential direction, a diameter of the circular recesses varying periodically along the tire circumferential direction in each of the recess columns.

13. The pneumatic tire according to claim 12, wherein a distance between a first circular recess in a recess column A of the recess columns and a second circular recess in a recess column B of the recess columns varies according to the variable size of each of the first circular recess and the second circular recess, the first circular recess and the second circular recess being in each of the recess rows and closest each other, and the recess column A and the recess column B being adjacent each other in the tire radial direction.

14. The pneumatic tire according to claim 1, wherein
a center-to-center distance in the tire radial direction between adjacent recesses in the tire radial direction within each of the recess rows is constant irrespective of the size varying periodically in the tire circumferential direction, and
a closest distance in the tire radial direction between edges of the adjacent recesses varies according to the size varying periodically in the tire circumferential direction.

15. The pneumatic tire according to claim 1, wherein the recesses vary in size in multiple orthogonal dimensions.

16. The pneumatic tire according to claim 1, wherein the recesses are arranged in regular columns, with centers of the recesses in an individual column being aligned in the radial direction.

17. The pneumatic tire according to claim 16, wherein recesses are arranged in regular rows, with centers of the recesses in an individual row being aligned along the tire circumferential direction.

18. The pneumatic tire according to claim 1, wherein recesses are arranged in regular rows, with centers of the recesses in an individual row being aligned along the tire circumferential direction.

* * * * *